Nov. 12, 1940.  E. H. LOCKWOOD  2,221,595
COMBINED HEAT ELEMENT AND BAFFLE
Filed Dec. 29, 1939  2 Sheets-Sheet 1

WITNESSES:

INVENTOR
Edwin H. Lockwood.
BY
ATTORNEY

Patented Nov. 12, 1940

2,221,595

UNITED STATES PATENT OFFICE 2,221,595

COMBINED HEAT ELEMENT AND BAFFLE

Edwin H. Lockwood, Mansfield, Ohio, assignor to Westinghouse Electric & Manufacturing Company, East Pittsburgh, Pa., a corporation of Pennsylvania Application December 29, 1939, Serial No. 311,617

8 Claims. (Cl. 219—35)

My invention relates to oven heaters and, more particularly, to a combination heater and heat evener.

In electric range ovens having front opening doors there is a definite loss of heat around the edges of the door. This is a heat loss which inherently accompanies such structures. Various attempts have been made to compensate for such heat loss, such as special heat baffles and door jambs. However, in all such cases, no attempt has been made to compensate for the fact that such heat loss decreases from the front to the rear of the oven.

Oven heaters and baffles having longitudinally extending slots therein have been used. However, in all such applications the slots have been of uniform width or of such configuration as does not take into consideration the relatively decreased heat requirements in the rear portion of the oven.

It is, therefore, an object of my invention to provide an oven heater and baffle which will supply an increasing amount of heat from the rear to the front portion of an oven having a front opening door to compensate for the decreasing heat loss from the front to the rear of the oven.

A further object of my invention is to provide an oven heater and baffle which produces an effective transverse circulation of heated air within the oven.

Another object of my invention is to provide an inexpensive, rugged, combination heater and baffle which has a centrally located longitudinally extending tapered aperture or slot positioned therein to insure a greater circulation of heated air in the front portion thereof than in the rear portion.

Other objects of my invention will either be pointed out specifically in the course of the following description of a device embodying my invention, or will be apparent from such description.

In the accompanying drawings, Figure 1 is a sectional view illustrating an oven and combination heater and shield embodying my invention;

Figure 1:
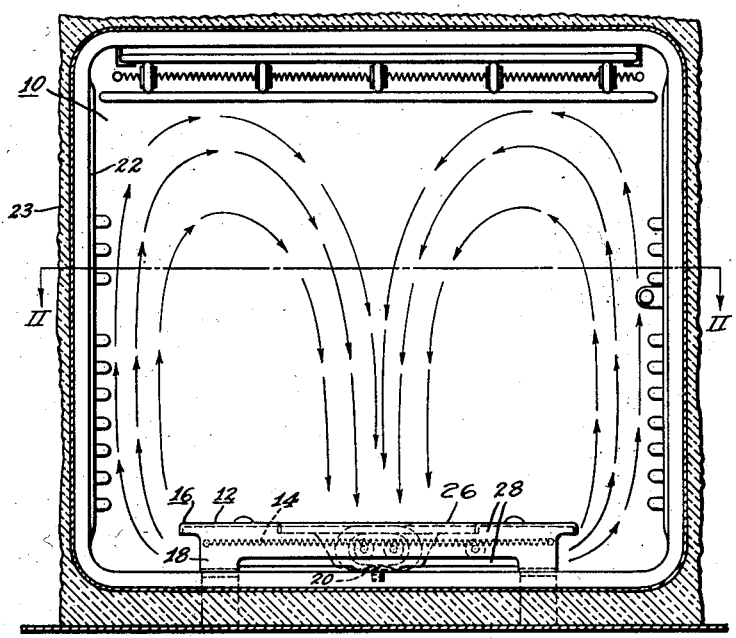
Figure 2:
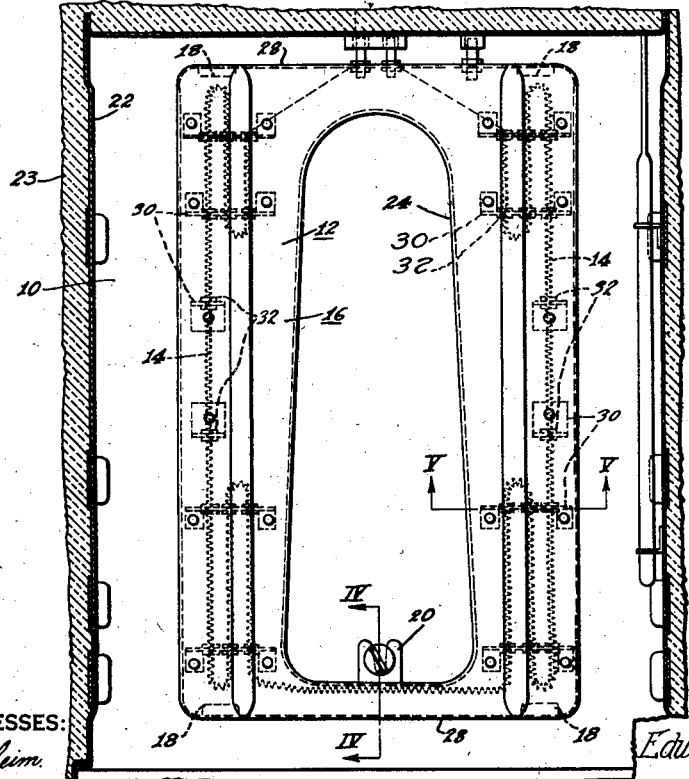
Fig. 2 is a sectional view taken along the line II—II of Fig. 1.

Referring to the accompanying drawings, in which like reference characters represent like parts in the several figures, I show a range oven structure 10, a combination heater and heat shield or baffle structure 12 comprising a heating element 14, and a shield or baffle 16, said shield or baffle being supported upon the floor of the oven 10 by suitable supporting members 18 and retained in such position by a suitable forked member 20.

The oven 10 in this instance comprises a metallic box-like structure 22 having an open front portion, the box-like structure 22 being insulated with a suitable insulating material 23 in a well known manner. The open portion of the oven 10 is, in this instance, located along the front wall thereof. It is to be understood that the oven 10 disclosed herein is used merely for illustrative purposes and that any other suitable oven structure may be employed in lieu thereof.

The combined heater and heat shield or baffle structure 12 comprises in this instance a substantially horizontally extending shield 16 and a heat element 14 insulatedly attached to the lower surface of such shield. A centrally located longitudinally extending tapered aperture 24, having the widest part thereof near the front of the shield 16, is located within the top portion 26 of shield 16 to permit a selectively graded passage of heated air therethrough, as hereinafter described.

The heat shield or baffle 16 comprises, in this instance, an upper horizontally extending top portion 26, dependent end portions 28 located at either end of the shield, supporting members 18 integral with the depending end portions 28 and a forked shaped retaining member 20 located at the front end of such structure. The top portion 26 is, in this instance, horizontally positioned with respect to the lower surface of the oven 10. However, if it be desired, such surface may be tapered inwardly and downwardly toward the centrally located aperture 24, to insure the heated air passing through such shield to move in a predetermined double path, namely, upwardly along the outer surface of the respective side walls of the oven 10 and downwardly through the aperture 24. (See arrows in Fig. 1.)

The depending end portions 28 located along the front and rear edges of shield 16 extend downwardly from the top portion 26 thereof substantially a distance equal to the height of such shield. In other words, the depending end portions 28 of shield 16 prevent any air from passing beneath either end portion of such shield. Further, such depending end portions in the absence of corresponding side portions insure a transverse movement of the air within the oven 10. The supports 18 are integral with the depending end portions 28 and are bent inwardly therefrom to retain the heat shield 16 a predetermined distance above the oven floor. This leaves a small space between the floor of the oven and the lower surface of the top portion 26 of the shield 16, which may be called the heating space.

The tapered aperture 24 extends approximately the full length of the shield 16 and is wider at the front than at the rear, preferably gradually tapering or narrowing down from the front towards the rear. This feature selectively determines the amount of air passing through such aperture at each cross-section thereof. In other words, a greater quantity of air will pass through the front portion of the shield and naturally the corresponding portion of the oven 10, than through the rear portion thereof. This feature of controlled uneven heat distribution compensates for the above-explained heat loss on the door structure and results in a uniform oven temperature as hereinafter described.

Figure 3:
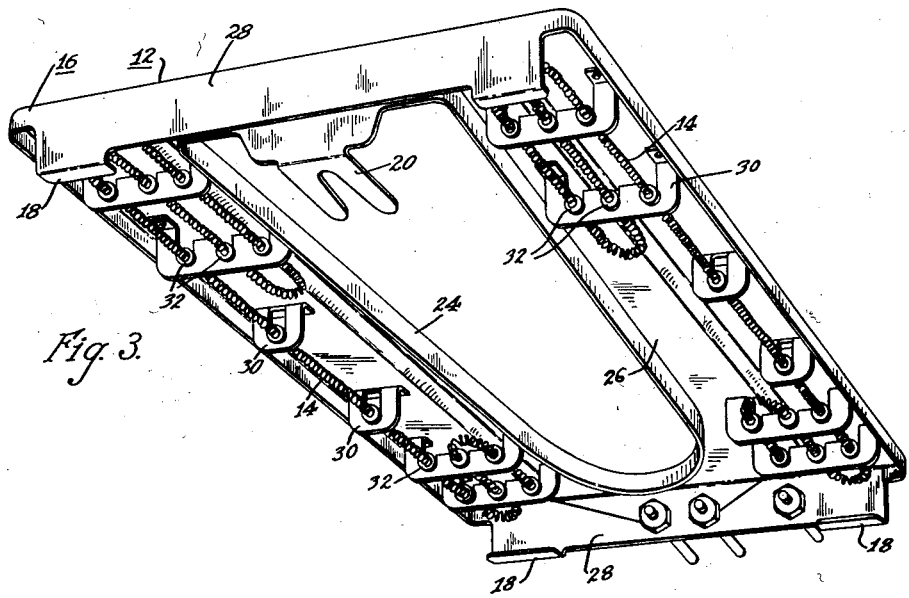
Fig. 3 is a perspective view illustrating a lower surface of the combination heater and heat baffle embodying my invention.
Figures 4, 5:
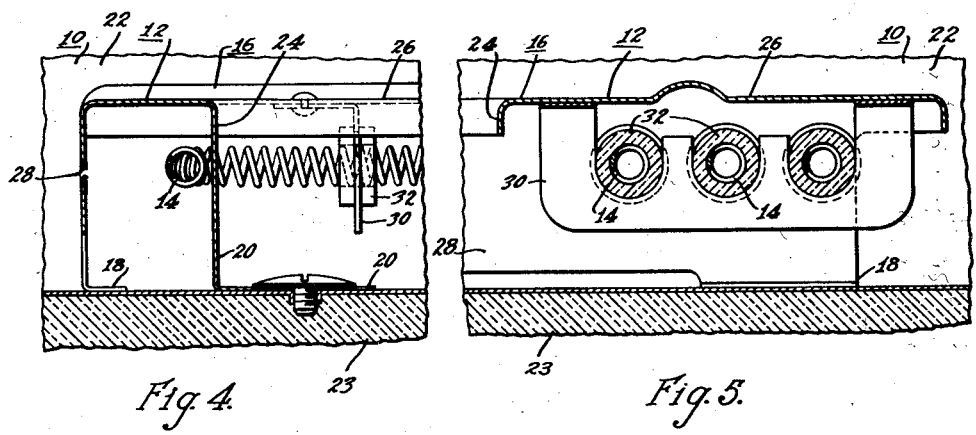
Figs. 4 and 5 are fragmentary sectional views, respectively, taken along the lines IV—IV and V—V of Fig. 2.

The heating element 14 is, in this instance, a spirally wound open uninsulated heating electrical resistor. The element 14 is insulatedly attached to the lower surface of the heat shield 16 by means of suitable angularly shaped brackets 30 30 (see Figs. 3, 4 and 5). Small grommet or eyelet shaped insulating members 32 are positioned within the brackets 30 to retain the heating element 14 in position and to insulate such element from the brackets and shield 16. The element 14 is thus positioned intermediate the top portion 26 of shield 16 and the oven floor when such structure is positioned within the oven 10. The heating element 14 is arranged in a symmetrical manner, extending along either side of the shield 16 about the centrally located aperture 24. However, such element is preferably doubled back upon itself at either end of the structure. The length or amount of "doubling back" of the element 14 is considerably greater at the front portion of the structure 12 than at the rear portion thereof. In other words, there is a considerable increase of available wattage at the front portion of the combined structure with respect to that available at the rear, which increase may, of course, be obtained by other arrangements of the heating element. This increased available heating ability of the combined heater and heat shield structure 12 at the front portion thereof tends to compensate for the increased heat losses in the front portion of the oven, thus aiding and abetting the above-described compensating action of the aperture 24 itself.

The increased intensity of heat at the front of the oven would, if the aperture 24 were substantially rectangular, increase the velocity of the heated air currents at the front portion of the oven 10. However, the aperture 24, being wider at the front than at the rear permits a greater quantity of air to pass therethrough whereupon (by proper proportioning of parts), there is a substantially constant velocity of heated air within the oven at all points. However, there is a tendency for the temperature of the air to become increasingly higher toward the front of the oven, this, in turn, compensating for the increasing loss of heat in the front of the oven through the door structure. The combined increased wattage at the front of the combination structure 12 and gradually increasing width of aperture 24 toward the front, selectively compensates at each cross-section of the oven for any loss of heat through the door structure, thus insuring the highly desirable uniform heat distribution throughout the oven.

Various modifications may be made in my invention without departing from the spirit and scope thereof, and I desire, therefore, that only such limitations shall be placed thereon as are imposed by the prior art and the appended claims.

I claim as my invention:

1. An oven heater comprising an upper baffle portion and a heating element insulatedly attached to the lower surface of such baffle, said portion having an aperture therein having different dimensions at different cross-sections for permitting varying quantities of heated air to pass therethrough.

2. An oven heater comprising an upper baffle portion, said portion having a centrally located tapered aperture therein for permitting varying quantities of heated air to pass therethrough, and a heating element insulatedly attached to the lower surface of such baffle and positioned about said aperture for heating the air passing therethrough.

3. An oven heater comprising an upper baffle portion, said portion having an aperture therein with different dimensions at different cross-sections for permitting varying quantities of heated air to pass therethrough, a heating element insulatedly attached to the lower surface of such baffle and positioned about said aperture with the portions thereof adjacent to the larger end of said aperture being arranged to produce areas of increased heat adjacent thereto.

4. In combination, an oven, a heating element therefor, a heat shield for supporting such element and directing the heat therefrom, said shield comprising an upper element supporting portion surrounding a centrally located tapered aperture, and a plurality of depending supports at the ends thereof, said supports cooperating with the oven to support the shield above the bottom of such oven to form a heating chamber therebetween with said heater located therein.

5. In combination, an oven, a heating element therefor, a heat shield for supporting such element and directing the heat therefrom, said shield comprising an upper element supporting portion surrounding a centrally located tapered aperture, a plurality of depending supports at the ends thereof, and a horizontally extending forked member, said supports cooperating with the oven to support the shield above the bottom of such oven to form a heating chamber therebetween with said heater located therein, said forked member cooperating with the oven to retain the shield in a predetermined position.

6. In combination, an oven having a floor and a front opening door causing decreasing heat losses from the front to the rear of the oven, a combination heater and heat shield comprising a heater, a heat shield positioned above the oven floor for supporting the heater between the shield and floor, said shield having an aperture therein having different dimensions at different cross-sections with the larger portion thereof adjacent the oven door, said heater positioned about the aperture and arranged to produce increased heat adjacent the sides of the larger portion of the aperture to supply increased amounts of heat to the air passing between the shield and oven floor and downwardly through said aperture for supplying increasingly heated air adjacent the oven door to compensate for the heat losses therefrom.

7. In combination, an oven having a floor and a front opening door causing decreasing heat losses from the front to the rear of the oven, a combination heater and heat shield comprising a heater, a heat shield positioned above the oven floor for supporting the heater between the shield and floor, said shield having a centrally located tapered aperture therein with the larger portion thereof adjacent the oven door, said heater positioned about the aperture and doubled back adjacent the sides of the larger portion of the aperture to supply increased amounts of heat to the air passing between the shield and oven floor and downwardly through said aperture for supplying increasingly heated air adjacent the oven door to compensate for the heat losses therefrom.

8. In combination, an oven having a floor and a front opening door causing decreasing heat losses from the front to the rear of the oven, a combination heater and heat shield comprising a heater, a heat shield positioned above the oven floor for supporting the heater between the shield and floor, said shield having an aperture therein having different dimensions at different cross-sections with the larger portion thereof adjacent the oven door, said heater positioned about the aperture and arranged to produce selectively increased heat adjacent the sides of the larger portion of the aperture for supplying heat compensation proportional to the losses.

EDWIN H. LOCKWOOD.